United States Patent Office 3,545,864
Patented Dec. 8, 1970

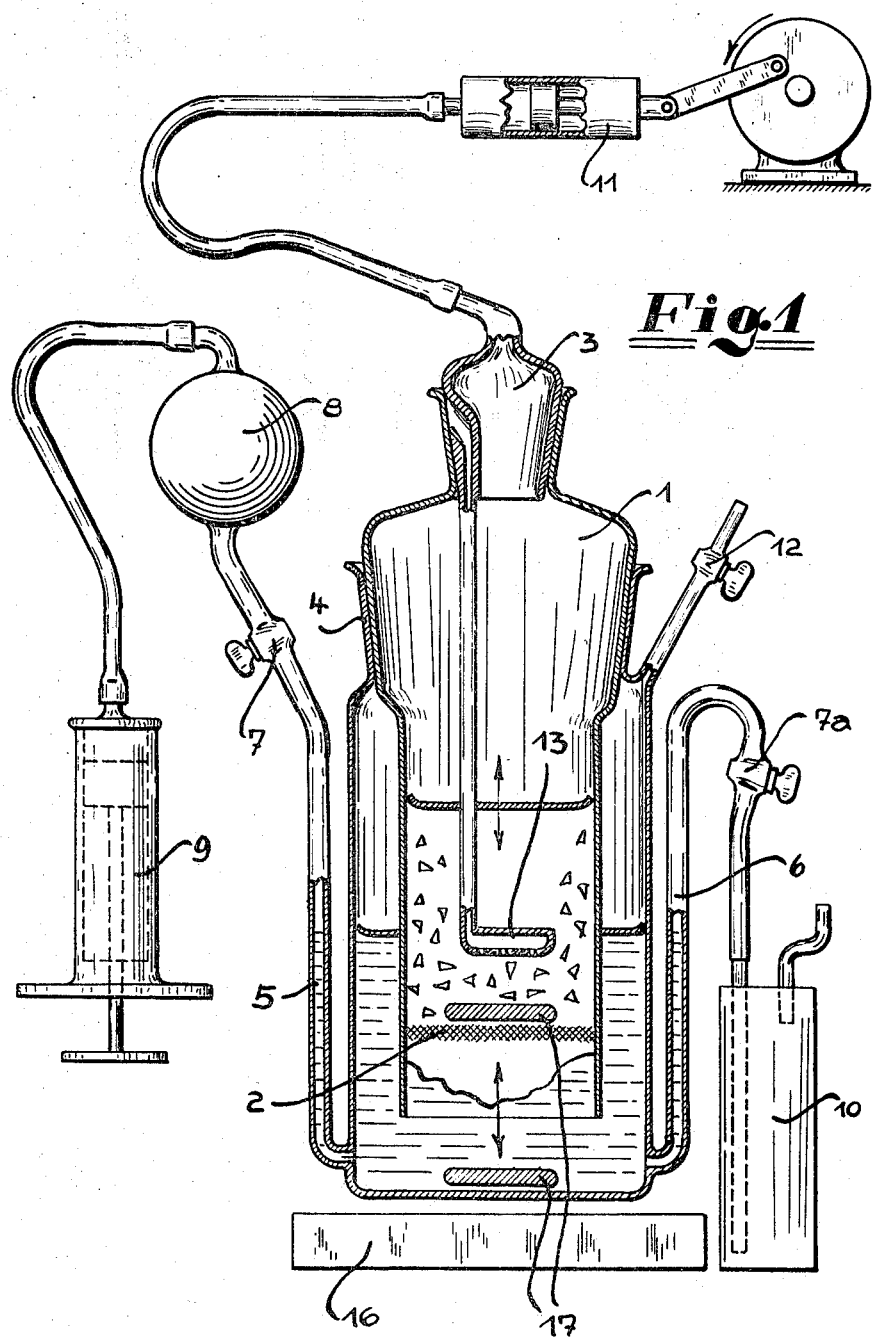

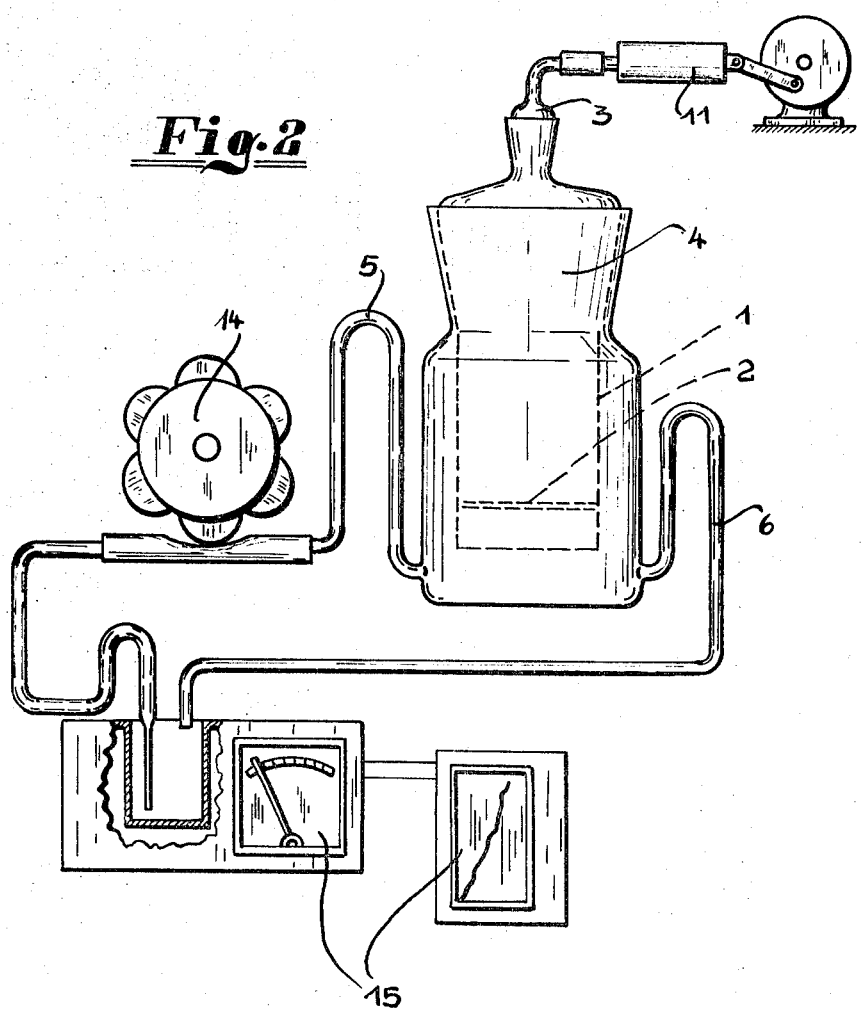

3,545,864
APPARATUS AND METHOD FOR DETERMINING
GASTRO-ENTERAL ABSORPTION QUOTA
Hans-Werner Dibbern, Kelkheim, Taunus, Germany, assignor to C. Desaga G.m.b.H., Heidelberg, Germany
Filed July 19, 1967, Ser. No. 654,560
Int. Cl. G01j 3/00; G01n 11/00, 31/06
U.S. Cl. 356—96                                      14 Claims

ABSTRACT OF THE DISCLOSURE

Substances are checked for gastro-enteral absorption quota by dissolving the substances in an aqueous phase, passing the solution through a frit filter, establishing a buffer of clear aqueous solution downstream of the frit filter and contacting the buffer with a lipoid phase. Apparatus includes two concentric vessels the inner of which opens downwardly into the other. An agitator is provided for both vessels and a pressure device places the aqueous phases continuously under pressure changing from positive pressure to vacuum pressure and vice versa. Samples are taken from lipoid phase and checked in a spectral photometer or the like.

DRAWING

FIG. 1 diagrammatically illustrates, in side view, an apparatus for exposing an aqueous phase to a lipoid solution in accordance with the invention; and FIG. 2 shows the apparatus connected with a sample examining device.

DETAILED DESCRIPTION

The present invention relates to apparatus and methods for determining the gastro-enteral absorption quota of a drug provided for peroral application.

Determinants for the absorption of a medicinal substance in the human or animal digestive tract include two physical chemical properties:

(1) The solubility and rate of solution of the active substance in the aqueous digestive juices (gastric juice, duodenal juice, intestinal juice) which can be simulated by buffer solutions with a pH value as it is also found in the digestive juices.

(2) The coefficient of distribution of the active substance, that is( the ratio of its solubility between aqueous phase and a lipoid phase in a distribution process between the two nonmiscible phases. The coefficient of distribution is defined as the ratio of the dissolved portion in the aqueous phase and the dissolved portion in the lipoid phase.

In view of their significance in respect of gastro-enteral absorption, each of these two properties has been individually described in literature and analytical determination has likewise been indicated separately for each property.

The separate determination of solubility and rate of solution and of the coefficient of distribution an an active substance does not provide, in general, a safe guide for a prediction of its absorption. On the one hand, a medicinal substance is well absorbed only if it has a sufficiently high coefficient of distribution. However, the higher the latter, according to definition, the lower the solubility of the active substance is in the aqueous phase. On the other hand, a minimum solubility and rate of solution in the aqueous digestive juices is an absolute prerequisite for its absorbability. It follows therefore that an optimum ratio obtainable from the water solubility and the coefficient of distribution must be the determinant factor for the absorption. However, no method is yet known which permits determining the optimum ratio that is the determinant for absorption. It is an object of the invention to provide apparatus and techniques to permit such a determination.

With the apparatus according to the invention, it is possible to determine that portion of a substance, particularly of an active substance, which is dissolved in the first step in a liquid corresponding to aqueous digestive juices and which is then transferred into the lipoid phase on the basis of its distribution behavior. The optimum ratio obtainable from water solubility and the coefficient of distribution is thus determined, which indicates substantially the resorption in vivo.

The apparatus of the present invention comprises an inner cylindrical vessel 1 open at the bottom and preferably of a transparent material such as glass. The vessel is closed approximately one third of the way from its bottom by a frit filter 2 of glass or ceramic material. The frit 2 should only be permeable on the basis of its pore width to clear aqueous solutions. The inner vessel 1 is closed at its top by a connecting tube 3 inserted, for example, in the form of a ground joint and placed by means of another ground joint in an outer glass vessel 4. Instead of ground joints, any other easily detachable type of joint for the two vessels can be used.

For taking liquid samples from the outer vessel 4, there are provided two communicating tubes 5 and 6 connected directly above the vessel bottom. These tubes can be shut off by two cocks 7 and 7a which, for example, are located at the general level of the connection of the two vessels. One of the communicating tubes is connected, preferably by means of a spherical widening 8, with a device for the production of a slight over or underpressure. This device may take the form, for example, of an injection syringe 9. The other communicating tube leads to a device which permits determining the concentration of the active substance in the liquid contained in the outer vessel 4. For a spectral photometric determination a cuvette such as the flow cuvette 10 can be used. Instead of the flow cuvette there can also be used, for example, any other vessel from which individual samples can be taken for determining the concentration, for example, by means of a pipette.

It is also possible to arrange a sampling device (such as a cock, pipette, etc.) on the outer vessel 4 at a point above or below the liquid level. In an apparatus which is only used for a single determination, the arrangement of a sampling device is not necessary.

The connecting tube 3 is connected with a device for producing a pressure change from positive pressure to vacuum such as, for example, a piston pump 11. In order to permit pressure equilization, an additional cock 12 is arranged on the outer vessel 4 substantially at the level of the joining of the vessels. The introduction of the test substance into the inner vessel 1 can be effected preferably by a basket 13, with a screen bottom, connected to the connecting tube 3.

A preferred embodiment of the invention provides that the liquid phase contained in the outer vessel 4 be driven by means of a hose pump 14 connected with the communicating tube 5 through a recording spectral photometer 15 and re-fed through the communicating tube 6 to the vessel 4. This way, it is possible to measure the concentration variation in the lipoid phase over the increased extinction.

The movement both of the aqueous phase contained in the inner vessel 1 and of the lipoid phase is effected preferably by magnetic stirring rods 17 driven by a magnetic stirring motor 16.

The method of determination according to the invention can be carried out with the above described apparatus, for example, as follows: The outer vessel 4 is filled above half-way with a lipoid solvent or a lipoid solvent mixture, the inner vessel 1 is filled with a buffer solution corresponding to the digestive juices equal to the volume of the liquid contained in the outer vessel. The lipoid solvents or solvent mixtures must have a specific gravity of over 1. By way of example, there can be used chlorinated hydrocarbons, such as methylene-chloride, carbon tetrachloride and particularly chloroform. These can be used individually, in mixture with each other, or in mixture with other solvents, such as esters or ethers such as, for example, acetic ester, butyl acetate, or higher alcohols such as amyl alcohol. The buffer solutions corresponding to the digestive juices should have a pH value of between 1 and 8. HCl-NaCl buffers with a pH of 1.2, phosphate buffers (pH 7.5) or buffers which correspond to the "simulated gastric fluid" or simulated enteric fluids" listed in USP XVI, p. 1072/1973 can be used, but without pepsin or pancreatin.

After the liquids are charged into the vessels, any air bubble trapped under the frit 2 is sucked off through the buffer solution by means of a vacuum applied to the connecting tube 3. No lipoid solvent should get into the frit. After standing for a short time with the cocks open, the required level of the separating layer buffer solution-lipoid solvent or lipoid solvent mixture is obtained approximately in the middle between the frit 2 and the lower edge of the inner vessel 1. If necessary, the level can be regulated by a slight pressure or suction at the connecting tube 3. The substance, which can be present, for example, in fine-crystalline or tablet form, is next placed in the buffer solution or introduced into the basket 13. By operating, for example, small piston pump 11, a slight over or underpressure is alternately exerted on the system, which substantially enhances the exchange through the filter frit. By turning on the magnetic stirring motor 16, the apparatus according to the invention is started. For this the cocks 7 and 7a are closed and the pressure equalizing cock 12 is open. At certain intervals, the lengths of which depend on the desired measuring accuracy, the piston pump 11 and the magnetic stirring motor 16 are stopped and a sample of the liquid solvent is forced out, for example, by slight pressure on the plunger of the injection syringe 9 while cocks 7 and 7a are open and cock 12 is closed. If the substance to be measured shows a measurable adsorption in the visible or ultraviolet spectral region, the sample is conducted directly to the cuvette, preferably a flow cuvette, of a spectral photometer. After measuring the extinction at a suitable wavelength, the lipoid solution is aspirated back into the vessel 4, for example, by the piston stroke of the injection syringe 9. After closing the cocks 7 and 7a and opening the cock 12, the piston pump 11 and magnetic stirrer 16 are switched on and the determination according to the invention is continued. It may be carried out, moreover, for several hours or days. The reaction temperature can be, for example, body temperature, but a lower temperature can be used if it is intended that the procedure be carried out more slowly. Higher temperatures may also be used.

The magnetic stirring rod in the aqueous phase insures constant uniform mixing. The stirring rod in the lipoid solvent phase increases the surface of the boundary layer and thus provides an accelerated distribution between the two phases. The displacement of the phase-separating layer effected by the piston movement must have at least the height of the filter plate 2. It is preferable, however, to select a larger pressure difference.

As mentioned in the above description, it is also possible to conduct the lipoid solvent phase by means of a hose pump 14, for example, in a closed cycle through the cuvette, and to measure thus continuously the increase of the extinction with a recording spectral photometer. For the determination of the substance dissolved in the lipoid solvent can also be used any other analytical method, apart from the spectral photometric method. The type of analytical method to be selected depends on the substance to be determined.

The apparatus according to the invention permits determining in one operation the optimal ratio of the rate of solution of a drug and its coefficient of distribution. Both the basic substances and medicinal preparations for peroral application, such as tablets, dragees, capsules and so forth can be tested.

With the apparatus according to the invention, it is furthermore possible to determine the absorption characteristic of a drug in its passage through the gastro-intestinal tract by setting the aqueous phase first to the pH value of the gastric juice and increasing the pH value at certain time intervals up to a range of 7 to 8 gradually or continually by adding alkali or buffer solutions in accordance with the physiological conditions. The dissolution-distribution process can continue in the meantime so that a graph of the absorption course is obtained by the increase in time of the concentration of the active substance in the lipoid solvent phase, which is characteristic for the respective medicinal substance and of paramount importance for its action in the organism. From the knowledge of these absorption graphs, it is possible to obtain important clues for the optimum form of its application and for the synthesis of new compounds. The apparatus according to the invention can furthermore be used to check results obtained in animal tests and to reduce their number in certain cases.

What is claimed is:

1. Apparatus for determining gastro-enteral absorption coefficient comprising an external vessel, an interior vessel inserted in the external vessel and capable of being closed to the outside, said interior vessel having a lower opening disposed within the external vessel, a frit in said interior vessel dividing the interior vessel into upper and lower compartments, the upper compartment being adapted for containing an aqueous solution containing a substance whose gastro-enteral absorption coefficient is to be determined, said external vessel being adapted to contain a lipoid solvent and having a closable outlet for removal of its contents, means connected to said upper compartment of the interior vessel to subject the contents thereof continuously to pressure alternating between vacuum and positive pressure, and measuring means coupled to the outlet of the exterior vessel for determining chemical properties of the contents of the external vessel caused by contact of said aqueous solution and said lipoid solvent whereby to determine the gastro-enteral absorption coefficient.

2. Apparatus according to claim 1 comprising stirrer means both in the upper compartment of the internal vessel and below said frit.

3. Apparatus according to claim 2 wherein said stirrer means comprise magnetic stirrer members.

4. Apparatus according to claim 1 wherein said external vessel has a connection at the bottom thereof, and a pump connected to said connection.

5. Apparatus according to claim 4 wherein said measuring means comprises a spectrophotometer connected to said outlet of the external vessel.

6. Apparatus according to claim 4 wherein said pump is a hose pump.

7. Apparatus according to claim 4 wherein the means to subject the contents in the upper compartment to pressure comprises a plunger pump.

8. Apparatus according to claim 7 comprising a plug in said interior vessel for connection of said plunger pump thereto.

9. Apparatus according to claim 4 wherein said pump is a plunger pump.

10. Apparatus according to claim 9 wherein said pump is a syringe, a bulb and stopcock being interposed between the syringe and said connection of the external vessel, and a stopcock interposed between said outlet of the external vessel and the measuring means.

11. A method for the determination of the gastro-enteral absorption coefficient of a medicinal substance comprising partially filling an outer vessel with a fluid lipoid phase, filling an inner vessel, inserted into the outer vessel, with an aqueous phase for dissolving the substance to be tested, the inner vessel being open at the bottom and communicating with the interior of the outer vessel via a frit inserted into the inner vessel above the open bottom thereof, forcing the aqueous phase with dissolved substance contained therein under pressure through the frit to form a buffer solution which makes contact with the lipoid phase in the outer vessel, removing samples of the lipoid phase from the outer vessel throughout the duration of the contact, and measuring the pH value of the samples whereby to determine the gastro-enteral absorption coefficient of said substance.

12. A method according to claim 11 wherein the pressure applied to the aqueous phase alternates continuously between positive and suction pressure values.

13. A method according to claim 11 wherein the lipoid phase is passed continuously through a spectrophotometer for determination of the pH value.

14. A method according to claim 11 comprising releasing the pressure for drawing off individual samples for pH measurement.

References Cited

UNITED STATES PATENTS

| | | | |
|---|---|---|---|
| 2,485,739 | 10/1949 | Johnstone | 23—259X |
| 2,643,940 | 6/1953 | Stevens | 23—259 |
| 2,729,550 | 1/1956 | Maycock et al. | 23—267X(P) |
| 3,053,846 | 9/1962 | Varcoe | 23—272.6X(S) |
| 3,058,813 | 10/1962 | Barney et al. | 23—259X |
| 3,423,192 | 1/1969 | Snover | 23—272.6X(S) |

MORRIS O. WOLK, Primary Examiner

B. S. RICHMAN, Assistant Examiner

U.S. Cl. X.R.

23—230, 253, 259, 267, 272.6; 73—53, 61.1; 356—182, 246